United States Patent
Sun et al.

(10) Patent No.: US 11,085,848 B2
(45) Date of Patent: Aug. 10, 2021

(54) METHOD OF ESTIMATING OXYGEN STORAGE CAPACITY OF CATALYST

(71) Applicant: GM Global Technology Operations LLC, Detroit, MI (US)

(72) Inventors: Min Sun, Troy, MI (US); Jonathan M. Davis, Farmington Hills, MI (US); Andrew M. Fedewa, Clarkston, MI (US); Scott H. Wittkopp, Ypsilanti, MI (US); Gionata Cimini, Milan (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 63 days.

(21) Appl. No.: 16/560,361

(22) Filed: Sep. 4, 2019

(65) Prior Publication Data

US 2021/0063270 A1    Mar. 4, 2021

(51) Int. Cl.
*G01M 3/26* (2006.01)
*F01N 3/10* (2006.01)

(52) U.S. Cl.
CPC .............. *G01M 3/26* (2013.01); *F01N 3/101* (2013.01); *F02D 2200/0814* (2013.01); *F02D 2200/0816* (2013.01)

(58) Field of Classification Search
CPC .. G01M 3/26; F01N 3/101; F02D 2200/0814; F02D 2200/0816
USPC ........................................................ 60/277
See application file for complete search history.

(56) References Cited

U.S. PATENT DOCUMENTS

| | | | |
|---|---|---|---|
| 6,272,848 B1* | 8/2001 | Okude | F01N 3/085 60/285 |
| 6,282,889 B1* | 9/2001 | Kakuyama | F02D 41/0295 60/277 |
| 6,782,695 B2* | 8/2004 | Lutz | F01N 11/007 60/285 |
| 6,840,036 B2* | 1/2005 | Fiengo | F01N 3/101 60/285 |
| 6,988,359 B2* | 1/2006 | Ide | F01N 3/101 60/277 |
| 2004/0107696 A1* | 6/2004 | Harrison | F02D 41/1439 60/285 |
| 2005/0267669 A1* | 12/2005 | Wang | F02D 41/0235 60/277 |
| 2006/0101808 A1* | 5/2006 | Nakagawa | F01N 11/007 60/277 |
| 2007/0234708 A1* | 10/2007 | Jones | F01N 11/00 60/277 |
| 2007/0256406 A1* | 11/2007 | Makki | F01N 11/007 60/277 |
| 2007/0256407 A1* | 11/2007 | Reuter | F01N 3/208 60/286 |
| 2012/0311995 A1* | 12/2012 | Rattasiri | F01N 11/007 60/277 |

(Continued)

*Primary Examiner* — Thai Ba Trieu

(57) ABSTRACT

A method of estimating the oxygen storage capacity of a catalyst includes providing an engine system having an internal combustion engine and an exhaust system having a catalyst and an oxygen sensor, providing a three-way catalyst observer model having a Kalman filter and a three-way catalyst kinetic model, estimating a three-way catalyst next time step state and a modeling error, linearizing the three-way catalyst observer model, filtering the estimated three-way catalyst next time step state, and calculating a covariance.

10 Claims, 2 Drawing Sheets

(56) References Cited

U.S. PATENT DOCUMENTS

| | | | |
|---|---|---|---|
| 2015/0139860 A1* | 5/2015 | Devarakonda | F01N 11/007 73/114.75 |
| 2015/0252744 A1* | 9/2015 | Onoe | F02D 41/0295 60/285 |
| 2016/0169077 A1* | 6/2016 | Srinivasan | F01N 3/101 60/285 |
| 2016/0169136 A1* | 6/2016 | Devarakonda | F02D 41/0295 60/285 |
| 2018/0266354 A1* | 9/2018 | Landolsi | F02D 41/18 |

* cited by examiner

METHOD OF ESTIMATING OXYGEN STORAGE CAPACITY OF CATALYST

INTRODUCTION

The present disclosure relates generally to a method of estimating the oxygen storage capacity of a catalyst of a catalytic converter for an internal combustion engine of a vehicle.

The ability to accurately estimate the oxygen storage capacity of a three-way catalyst results in increased fuel savings for an internal combustion engine. Current methods of estimation of oxygen storage capacity utilizing fuel cut off during a deceleration maneuver does not provide an accurate enough estimation to allow for more aggressive fuel strategy that provides such fuel savings. As a result, a new method of estimating oxygen storage capacity is required to achieve significant fuel saving without adding hardware to the engine system.

In addition, the catalyst must work properly and at a certain capacity to effectively reduce emissions and to pass vehicle regulations. Monitoring of the catalyst's ability to function accomplishes this objective.

Accordingly, there is a need for a new method of estimating oxygen storage capacity for effective fuel strategy for increased fuel efficiency and monitoring of its ability to function without adding additional cost in vehicle hardware.

SUMMARY

A method of estimating the oxygen storage capacity of a catalyst is provided. The method comprises providing an engine system, providing a three-way catalyst observer model, calculating an estimated three-way catalyst oxygen storage capacity next time step state and a modeling error, linearizing the three-way catalyst observer model, filtering the estimated three-way catalyst oxygen storage capacity next time step state to provide an updated estimated three-way catalyst oxygen storage capacity, and controlling a plurality of engine control input variables based on updated estimated three-way catalyst oxygen storage capacity. The three-way catalyst observer model provides an estimate of the oxygen storage capacity of the three-way catalyst based on a plurality of measured inputs. The engine system has an internal combustion engine and an exhaust system including a three-way catalyst and an oxygen sensor.

In one example of the present disclosure, the method further comprises calculating a result covariance for use in calculating the estimated three-way catalyst oxygen storage capacity next time step state.

In another example of the present disclosure, the method further comprises providing a three-way catalyst observer model having a Kalman filter and a three-way catalyst kinetic model, the three-way catalyst kinetic model includes a three-way catalyst thermal model, the three-way catalyst observer model providing an estimate of the oxygen storage capacity of the three-way catalyst based on a plurality of measured inputs.

In yet another example of the present disclosure, the method further comprises providing a three-way catalyst observer model, the three-way catalyst observer model providing an estimate of the oxygen storage capacity of the three-way catalyst based on a plurality of measured inputs, and the plurality of measured inputs include at least one of a pre-catalyst equivalence ratio, a fuel flow rate, exhaust gas pressure, ambient temperature, a pre-catalyst exhaust gas temperature, oxygen sensor voltage, a metered air per cylinder value, an engine speed value, and a fuel control state value.

In yet another example of the present disclosure, the method further comprises calculating an estimated three-way catalyst oxygen storage capacity next time step state using:

$$\hat{x}_{k|k-1} = f(\hat{x}_{k-1|k-1}, u_k) \text{ and}$$

a modeling error using:

$$\tilde{y}_k = z_k - h(\hat{x}_{k|k-1}), \text{ and}$$

wherein $\hat{x}_{k-1|k-1}$ is a previous estimated three-way catalyst oxygen storage capacity, $u_k$ represents the measured inputs, and $z_k$ represents a voltage output of the oxygen sensor.

In yet another example of the present disclosure, the method further comprises linearizing the three-way catalyst observer model using:

$$F_k = \frac{\partial y}{\partial x}\bigg|_{\hat{x}_{k-1|k-1}, u_k}, \text{ and}$$

$$H_k = \frac{\partial y}{\partial x}\bigg|_{\hat{x}_{k|k-1}}.$$

In yet another example of the present disclosure, the method further comprises filtering the estimated three-way catalyst oxygen storage capacity next time step state to provide an updated estimated three-way catalyst oxygen storage capacity using:

$$P_{k|k-1} = F_k P_{k-1|k-1} F_k^T + Q_k,$$

$$S_k = H_k P_{k|k-1} H_k^T R_k,$$

$$K_k = P_{k|k-1} H_k^T S_k^{-1}, \text{ and}$$

$$\hat{x}_{k|k} = \hat{x}_{k|k-1} + K_k \tilde{y}_k.$$

In yet another example of the present disclosure, the method further comprises further comprising calculating a result covariance for use in calculating the estimated three-way catalyst oxygen storage capacity next time step state using:

$$P_{k|k} = (I - K_k H_k) P_{k|k-1}.$$

In yet another example of the present disclosure, the method further comprises further comprises providing an engine system having an internal combustion engine and an exhaust system including the three-way catalyst and a post oxygen switch sensor.

In yet another example of the present disclosure, the method further comprises providing an engine system having an internal combustion engine and an exhaust system including the three-way catalyst and a pre-catalyst wide-range post oxygen sensor.

Another method of estimating the oxygen storage capacity of a catalyst is provided. The method comprises providing an engine system, providing a three-way catalyst observer model, calculating an estimated three-way catalyst oxygen storage capacity next time step state and a modeling error, linearizing the three-way catalyst observer model, filtering the estimated three-way catalyst oxygen storage capacity next time step state to provide an updated estimated three-way catalyst oxygen storage capacity, calculating a result covariance for use in calculating the estimated three-way catalyst oxygen storage capacity next time step state, and controlling a plurality of engine control input variables based on updated estimated three-way catalyst oxygen storage capacity. The three-way catalyst observer model provides an estimate of the oxygen storage capacity of the three-way catalyst based on a plurality of measured inputs. The engine system has an internal combustion engine and an exhaust system including a three-way catalyst and an oxygen sensor. The plurality of measured inputs include at least one of a pre-catalyst equivalence ratio, a fuel flow rate, exhaust gas pressure, ambient temperature, a pre-catalyst exhaust gas temperature, oxygen sensor voltage, a metered air per cylinder value, an engine speed value, and a fuel control state value. Calculating an estimated three-way catalyst oxygen storage capacity next time step state using:

$$\hat{x}_{k|k-1} = f(\hat{x}_{k-1|k-1}, u_k) \text{ and}$$

a modeling error using:

$$\tilde{y}_k = z_k - h(\hat{x}_{k|k-1}), \text{ and}$$

wherein $\hat{x}_{k-1|k-1}$ is a previous estimated three-way catalyst oxygen storage capacity, $u_k$ represents the measured inputs, and $z_k$ represents a voltage output of the oxygen sensor.

In one example of the present disclosure, the method further comprises linearizing the three-way catalyst observer model using:

$$F_k = \frac{\partial y}{\partial x}\bigg|_{\hat{x}_{k-1|k-1}, u_k}, \text{ and}$$

$$H_k = \frac{\partial y}{\partial x}\bigg|_{\hat{x}_{k|k-1}}.$$

In one example of the present disclosure, the method further comprises filtering the estimated three-way catalyst oxygen storage capacity next time step state to provide an updated estimated three-way catalyst oxygen storage capacity using:

$$P_{k|k-1} = F_k P_{k-1|k-1} F_k^T <+ Q_k,$$

$$S_k = H_k P_{k|k-1} H_k^T R_k,$$

$$K_k = P_{k|k-1} H_k^T S_k^{-1}, \text{ and}$$

$$\hat{x}_{k|k} = \hat{x}_{k|k-1} + K_k \tilde{y}_k.$$

In one example of the present disclosure, the method further comprising calculating a result covariance for use in calculating the estimated three-way catalyst oxygen storage capacity next time step state using:

$$P_{k|k} = (I - K_k H_k) P_{k|k-1}.$$

An engine system for a vehicle is provided. The engine system comprises an internal combustion engine having an exhaust gas outlet, and exhaust system, and an engine control module. The exhaust system has a three-way catalyst and an oxygen sensor. The exhaust system includes an exhaust gas inlet in downstream communication with the exhaust gas outlet of the internal combustion engine. The engine control module has a control logic sequence. The engine control module controls the diesel engine system. The first control logic estimates a three-way catalyst oxygen storage capacity next time step state and a modeling error using a plurality of measured inputs. The second control logic linearizes the three-way catalyst observer model. The third control logic calculates a filtered estimated three-way catalyst oxygen storage capacity next time step state and calculates a covariance. The fourth control logic is configured to control the internal combustion engine based on the filtered estimated three-way catalyst oxygen storage capacity next time step state.

In one example of the present disclosure, the oxygen sensor is one of a post oxygen switch sensor and a pre-catalyst wide-range post oxygen sensor.

In another example of the present disclosure, the plurality of measured inputs include a pre-catalyst equivalence ratio, a fuel flow rate, exhaust gas pressure, ambient temperature, a pre-catalyst exhaust gas temperature, oxygen sensor voltage, a metered air per cylinder value, an engine speed value, and a fuel control state value.

In yet another example of the present disclosure, the first control logic further includes estimating the three-way catalyst oxygen storage capacity next time step state using:

$$\hat{x}_{k|k-1} = f(\hat{x}_{k-1|k-1}, u_k) \text{ and}$$

a modeling error using:

$$\tilde{y}_k = z_k - h(\hat{x}_{k|k-1}), \text{ and}$$

wherein $\hat{x}_{k-1|k-1}$ is a previous estimated three-way catalyst oxygen storage capacity, $u_k$ represents the measured inputs, and $z_k$ represents a voltage output of the oxygen sensor.

In another example of the present disclosure, the second control logic further includes linearizing the three-way catalyst observer model further comprises linearizing the three-way catalyst observer model using:

$$F_k = \frac{\partial y}{\partial x}\bigg|_{\hat{x}_{k-1|k-1}, u_k}, \text{ and}$$

$$H_k = \frac{\partial y}{\partial x}\bigg|_{\hat{x}_{k|k-1}}.$$

In another example of the present disclosure, the third control logic further includes calculating the filtered estimated three-way catalyst oxygen storage capacity next time step state using:

$$P_{k|k-1} = F_k P_{k-1|k-1} F_k^T <+ Q_k,$$

$$S_k = H_k P_{k|k-1} H_k^T R_k,$$

$$K_k = P_{k|k-1} H_k^T S_k^{-1}, \text{ and}$$

$$\hat{x}_{k|k} = \hat{x}_{k|k-1} + K_k \tilde{y}_k.$$

calculating the covariance using:

$$P_{k|k} = (I - K_k H_k) P_{k|k-1}.$$

The above features and advantages and other features and advantages of the present disclosure are readily apparent from the following detailed description when taken in connection with the accompanying drawings.

BRIEF DESCRIPTION OF THE DRAWING

The drawings described herein are for illustration purposes only and are not intended to limit the scope of the present disclosure in any way.

DESCRIPTION

The following description is merely exemplary in nature and is not intended to limit the present disclosure, application, or uses. The term "about" as used in the description is defined as an amount around a specific number that does not have a significant impact on the results of the operation.

Figure 1:
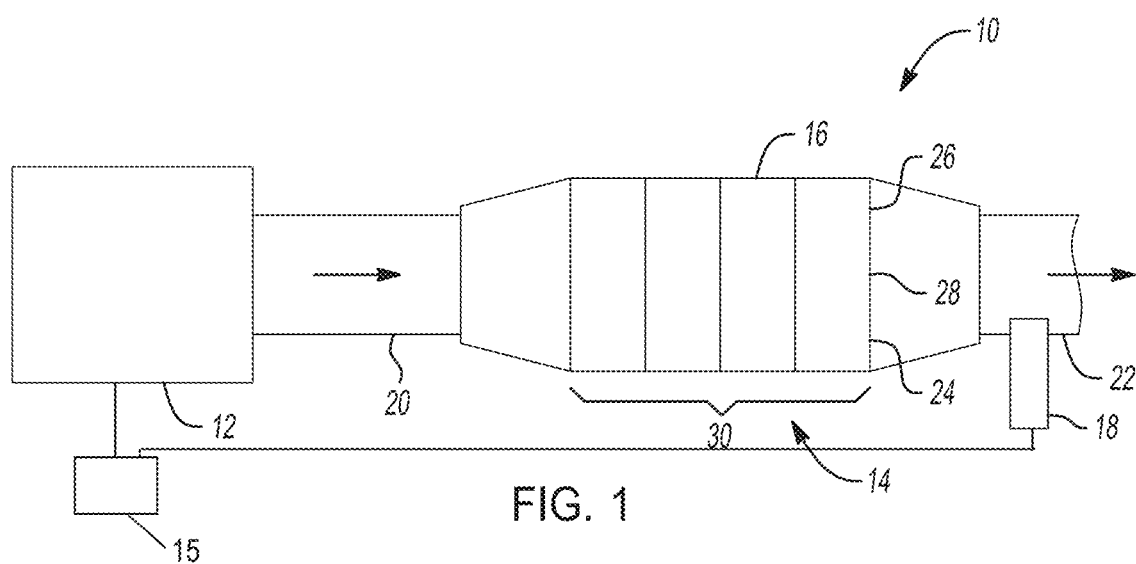
FIG. 1 is a schematic cross-section of a catalyst according to the principles of the present disclosure.
Figure 2:
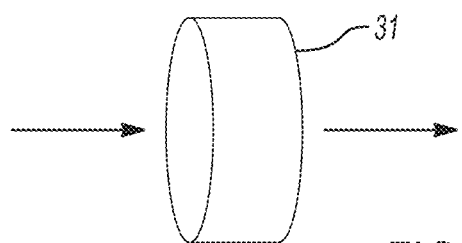
FIG. 2 is a schematic of a portion of a catalyst according to the principles of the present disclosure.

Referring to FIGS. 1 and 2, a schematic for an engine system 10 for a vehicle is illustrated and will now be described. The engine system 10 includes an internal combustion engine (ICE) 12, an exhaust system 14, and an engine control module 15. The exhaust system 14 includes a catalyst assembly 16 and an oxygen sensor 18. More particularly, the catalyst assembly 16 has an exhaust gas inlet 20 and an exhaust gas outlet 22, and a three-way catalyst 24. The oxygen sensor 18 is disposed in the exhaust gas outlet 22 and may be a post oxygen switch sensor or a pre-catalyst wide-range post oxygen sensor. The exhaust gas inlet 20 receives exhaust gas from the ICE and directs the exhaust gas to the three-way catalyst 24. The three-way catalyst 24 includes a ceramic substrate 26 on which is disposed a catalytic metal coating 28. In the present example, the catalytic metal coating 28 includes Cerium Oxide ($Ce_2O_3$). However, other metal oxides or combinations of metal oxides may be incorporated into the three-way catalyst 24 without departing from the scope of the present disclosure. For example, the catalytic metal coating 28 may include oxides of Rhodium (Rh), Palladium (Pd), and Platinum (Pt) among other metal oxides.

The engine control module 15 is preferably an electronic control device having a preprogrammed digital computer or processor, control logic, memory used to store data, and at least one I/O peripheral. The control logic includes a plurality of logic routines for monitoring, manipulating, and generating data. The engine control module 15 controls the plurality of actuators, pumps, valves, and other devices associated with the engine system 10 control according to the principles of the present disclosure. The control logic may be implemented in hardware, software, or a combination of hardware and software. For example, control logic may be in the form of program code that is stored on the electronic memory storage and executable by the processor. The engine control module 15 receives the output signal of each of several sensors on the vehicle, performs the control logic and sends command signals to several control devices. For example, a control logic implemented in software program code that is executable by the processor of the engine control module 15 includes a control logic for implementing a method described further below.

For the purposes of the present disclosure, the three-way catalyst is virtually separated into a plurality of segments 30. One such segment 31, is shown in FIG. 2 and represents a one dimensional portion through which the catalytic reactions occur. The constituents of the exhaust gas going into the segment includes $[O_2]_{in}$, $[CO]_{in}$, $[CO_2]_{in}$, $[H_2]_{in}$, and $[H_2O]_{in}$ at an incoming gas temperature $T_{gin}$. After the catalytic reaction, the treated gas coming out of the segment includes $[O_2]_{out}$, $[CO]_{out}$, $[CO_2]_{out}$, $[H_2]_{out}$, and $[H_2O]_{out}$ at an outgoing gas temperature $T_{gout}$. For example, a first catalytic reaction is an Oxygen storage reaction represented by the following:

$$O_2 + 2Ce_2O_3 \leftrightarrow 2Ce_2O_4;$$

$$r_1 = k_1^f OSC^2(1 - \varphi_{O_2})^2 [O_2] - k_1^b OSC^2 \varphi_{O_2}^2 C_0;$$

$$k_1^f = A_1^f e^{-\frac{E_1^f}{T}}, \text{ and}$$

$$k_1^b = A_1^b e^{-\frac{E_1^b}{T}}.$$

A second catalytic reaction is a Carbon Monoxide Oxidation reaction represented by the following:

$$CO + Ce_2O_4 \leftrightarrow CO_2 + Ce_2O_3;$$

$$r_2 = k_2^f OSC \varphi_{O_2} [CO] - k_2^b OSC(1 - \varphi_{O_2})[CO_2];$$

$$k_2^f = A_2^f e^{-\frac{E_2^f}{T}}, \text{ and}$$

$$k_2^b = A_2^b e^{-\frac{E_2^b}{T}}.$$

A third catalytic reaction is a Hydrogen Oxidation reaction represented by the following:

$$H_2 + Ce_2O_4 \leftrightarrow H_2O + Ce_2O_3;$$

$$r_3 = k_3^f OSC \varphi_{O_2} [H_2] - k_3^b OSC(1 - \varphi_{O_2})[H_2O];$$

$$k_3^f = A_3^f e^{-\frac{E_3^f}{T}}, \text{ and}$$

$$k_3^b = A_3^b e^{-\frac{E_3^b}{T}}.$$

Oxygen storage value (OSV) is calculated using the following equation, where OSC is the oxygen storage capacity:

$$OSC \frac{\partial \varphi_{O_2}}{\partial t} = 2r_1 - r_2 - r_3.$$

The treated exhaust gas constituents coming out of the catalyst segment are calculated as follows:

$$[O_2]_{out} = \frac{[O_2]_{in} + k_1^b OSC^2 \varphi_{O_2}^2 C_0 t_r}{1 + k_1^f OSC^2 (1 - \varphi_{O_2})^2 t_r}$$

$$[CO]_{out} = \frac{[CO]_{in} + ([CO]_{in} + [CO_2]_{in}) k_2^b OSC(1 - \varphi_{O_2}) t_r}{1 + k_2^b OSC(1 - \varphi_{O_2}) t_r + k_2^f OSC \varphi_{O_2} t_r}$$

$$[CO_2]_{out} = \frac{[CO_2]_{in} + ([CO]_{in} + [CO_2]_{in}) k_2^f OSC(1 - \varphi_{O_2}) t_r}{1 + k_2^b OSC(1 - \varphi_{O_2}) t_r + k_2^f OSC \varphi_{O_2} t_r}$$

$$[H_2]_{out} = \frac{[H_2]_{in} + ([H_2]_{in} + [H_2O]_{in}) k_3^b OSC(1 - \varphi_{O_2}) t_r}{1 + k_3^b OSC(1 - \varphi_{O_2}) t_r + k_3^f OSC \varphi_{O_2} t_r}$$

$$[H_2O]_{out} = \frac{[H_2O]_{in} + ([CO]_{in} + [CO_2]_{in}) k_3^f OSC(1 - \varphi_{O_2}) t_r}{1 + k_3^b OSC(1 - \varphi_{O_2}) t_r + k_3^f OSC \varphi_{O_2} t_r}$$

Figure 3:
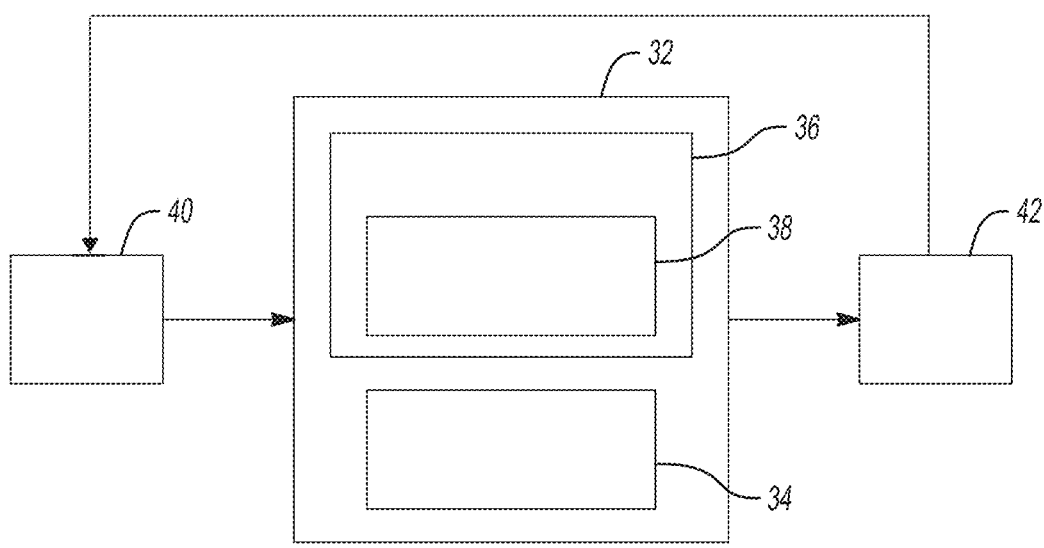
FIG. 3 is an operational model of a three-way catalyst according to the principles of the present disclosure.

Turning now to FIG. 3, a three-way catalyst observer model 32 is illustrated and will now be described. The three-way catalyst observer model 32 includes a Kalman filter 34 and a three-way catalyst kinetic model 36. The three-way catalyst kinetic model 36 includes a three-way catalyst thermal model 38. Inputs 40 into the three-way catalyst observer model 32 include a pre-catalyst equivalence ratio, a fuel flow rate, exhaust gas pressure, ambient temperature, a pre-catalyst exhaust gas temperature, oxygen sensor 18 voltage, a metered air per cylinder value, an engine speed value, and a fuel control state value. Outputs 42 of the three-way catalyst observer model 32 include an oxygen storage value (OSV), a post-catalyst equivalence ratio (EQR), a post-catalyst switch voltage, OSC, and a pre-catalyst EQR offset.

Figure 4:
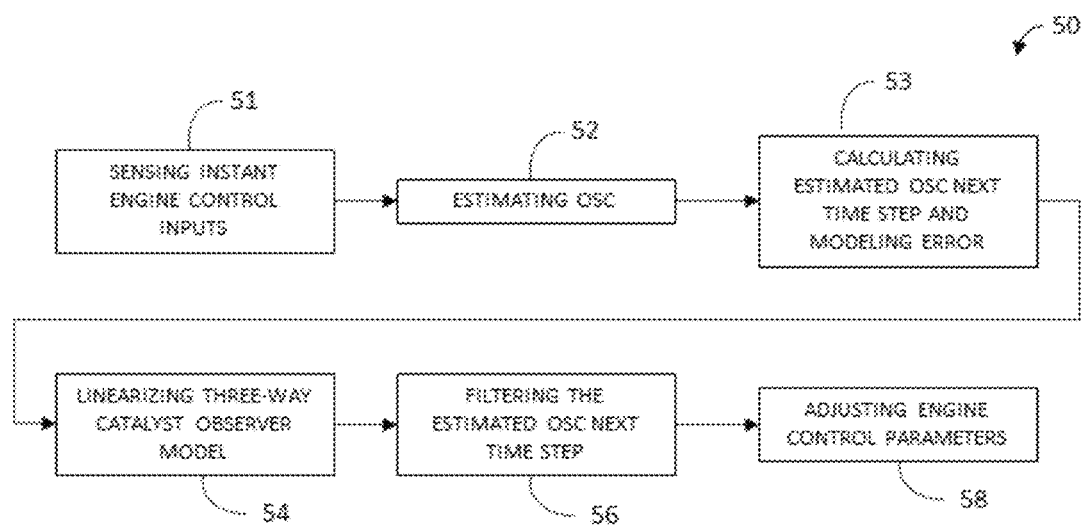
FIG. 4 is a flowchart depicting steps of a method according to the principles of the present disclosure.

Turning now to FIG. 4 with continuing reference to FIG. 3, a flowchart is illustrated for a method 50 of dynamically estimating the OSC of the three-way catalyst 24. The method 50 includes a first step (or first control logic) 51 of sensing a plurality of instant engine control inputs via at least one sensor. A second step (or second control logic) 52 estimates the oxygen storage capacity of the three-way catalyst based on the plurality of the instant engine control inputs via the three-way catalyst observer model. A third step (or third control logic) 53 includes calculating an estimated a three-way catalyst next time step state and a modeling error using:

$$\hat{x}_{k|k-1} = f(\hat{x}_{k-1|k-1}, u_k) \text{(predicted state estimate), and}$$

$$\tilde{y}_k = z_k - h(\hat{x}_{k|k-1}) \text{(innovation).}$$

In the first equation or predicted state estimate, $\hat{x}$ is the estimate of OSC and $u_k$ is the input or measured engine-out air to fuel ratio. At time k, the observation or measurement $z_k$ is the oxygen sensor voltage measurement. A fourth step (or fourth control logic) 54 linearizes the three-way catalyst observer model using:

$$F_k = \left.\frac{\partial y}{\partial x}\right|_{\hat{x}_{k-1|k-1}, u_k}, \text{ and}$$

$$H_k = \left.\frac{\partial y}{\partial x}\right|_{\hat{x}_{k|k-1}}.$$

A fifth step (or fifth control logic) 56 filters the estimated three-way catalyst next time step state and calculates a covariance using:

$$P_{k|k-1} = F_k P_{k-1|k-1} F_k^T < + Q_k \text{ (predicted error covariance),}$$

$$S_k = H_k P_{k|k-1} H_k^T R_k \text{ (innovation covariance),}$$

$$K_k = P_{k|k-1} H_k^T S_k^{-1} \text{ (optimal Kalman gain),}$$

$$\hat{x}_{k|k} = \hat{x}_{k|k-1} + K_k \tilde{y}_k \text{ (updated estimate), and}$$

$$P_{k|k} = (I - K_k H_k) P_{k|k-1} \text{ (updated estimate covariance).}$$

A sixth step (or sixth control logic) 58 adjusts, using the engine control module, a plurality of engine control input parameters based on the updated estimated three-way catalyst oxygen storage capacity.

Incorporating the above disclosed method 50 into control logic that is operational by the engine control module 15 includes a first control logic for estimating a three-way catalyst next time step state and a modeling error using a plurality of measured inputs including a pre-catalyst equivalence ratio, a fuel flow rate, exhaust gas pressure, ambient temperature, a pre-catalyst exhaust gas temperature, oxygen sensor 18 voltage, a metered air per cylinder value, an engine speed value, and a fuel control state value. A second control logic linearizes the three-way catalyst observer model. A third control logic filters the estimated three-way catalyst next time step state and calculates a covariance.

Figure 5:
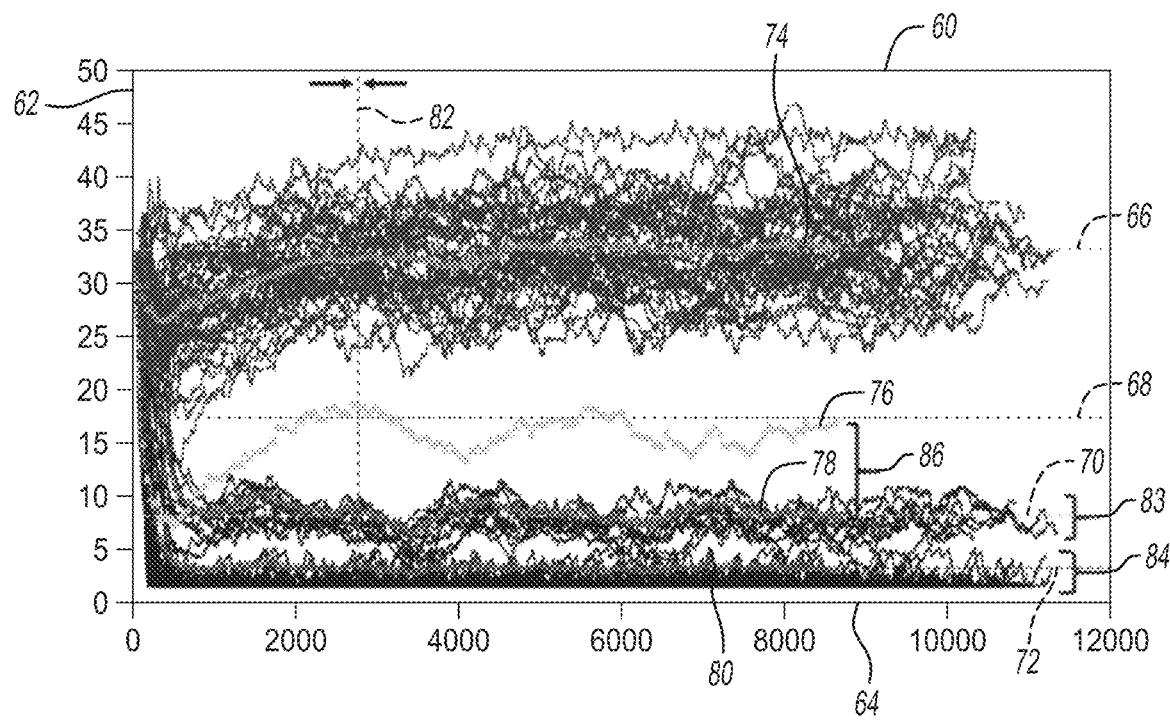
FIG. 5 is a graph showing an estimation of oxygen storage capacity of a catalyst over time according to the principles of the present disclosure.

With reference to FIG. 5, a graph 60 depicting the performance of the three-way catalyst observer model 32 and method 50 is illustrated and will now be described. The graph 60 includes a y-axis 62 depicting the estimated OSC over time 64 in seconds (x-axis). The dashed reference lines represent Worst Performing Acceptable (WPA) mean 66, WPA −4σ 68, Best Performing Unacceptable (BPU) +2σ 70 (70 is for BPU with a WPA post O2 sensor), and BPU mean 72. The performance lines represent calculated time-based WPA mean 74, time-based WPA −4σ 76, time-based BPU +2σ 78, and time-based BPU mean 80. The vertical dashed line represents the equivalent time of two Federal Test Procedure (FTP) cycles 82. The several lines contained by the bracket 83 represent the WPA degraded post oxygen sensor. The several lines contained by the bracket 84 represent the non-degraded post oxygen sensor. The bracket 86 represents the difference between the WPA −4σ and BPU +2σ.

Estimated OSC is used to determine fuel strategy. For example, when estimated OSC is low, a lean fuel strategy (air/fuel ratio is less than stoichiometric) is incorporated to introduce less fuel into the engine. Less fuel requires less Oxygen to burn the fuel leaving more Oxygen to store in the catalyst. Alternatively, stoichiometric and rich air/fuel ratio leaves less Oxygen available to store in the catalyst and therefore the oxidation of CO and H2 in the catalyst depletes the Oxygen storage of the catalyst. Current fuel strategies do not have the input of an accurate OSC estimation and therefore are required to assume OSC is low and requires more Oxygen to increase storage leading to reduced engine performance and higher fuel consumption. The capability to have a more accurate OSC estimation allows engine calibration to more accurately determine when the catalyst requires Oxygen to increase OSC and therefore run a fuel strategy more tailored to engine performance and other parameters that fuel strategy is used to control.

The oxygen storage capacity of the catalyst 24 is an indicator of the ability of the catalyst to effectively reduce emissions. For example, if the catalyst has aged to a significant extent, the oxygen storage capacity will be low and the catalyst can be deemed to be insufficient to perform its emission reduction function when then oxygen storage capacity is below a threshold. In addition, if the wrong type of catalyst is installed in a vehicle, it may also not meet the threshold oxygen storage capacity, which would also indicate that the catalyst is not function property. Therefore, the present system is configured to send a signal indicating that the oxygen storage capacity is below the threshold, so that corrective action may be taken. For example, the signal may be used actuate a malfunction light, such as a "check engine" light. In addition, or in the alternative, the signal may be used by the vehicle controller to perform other corrective actions, such as limiting the vehicle's fuel supply until the catalyst is replaced and meets the oxygen storage capacity minimum threshold.

While examples have been described in detail, those familiar with the art to which this disclosure relates will recognize various alternative designs and examples for practicing the disclosed method within the scope of the appended claims.

The invention claimed is:

1. A method of estimating an oxygen storage capacity of a three-way catalyst in an engine system having an internal combustion engine with an exhaust system including a three-way catalyst and an oxygen sensor, an engine control module, and a three-way catalyst observer model including a Kalman filter and a three-way catalyst kinetic model with a three-way catalyst thermal model, the method comprising steps of:

sensing a plurality of instant engine control inputs via at least one sensor;

estimating of the oxygen storage capacity of the three-way catalyst based on the plurality of the instant engine control inputs via the three-way catalyst observer model;

calculating an estimated three-way catalyst oxygen storage capacity next time step state using:

$\hat{x}_{k|k-1} = f(\hat{x}_{k-1|k-1}, u_k)$, and a modeling error using:

$\tilde{y}_k = z_k - h(\hat{x}_{k|k-1})$, and wherein $\hat{x}_{k-1|k-1}$ is a previous estimated three-way catalyst oxygen storage capacity, uk represents the plurality of the instant engine control inputs, and $z_k$ represents a voltage output of the oxygen sensor;

linearizing the three-way catalyst observer model using:

$$F_k = \frac{\partial y}{\partial x}\bigg|_{\hat{x}_{k-1|k-1}, u_k}, \text{ and}$$

$$H_k = \frac{\partial y}{\partial x}\bigg|_{\hat{x}_{k|k-1}}.$$

filtering the estimated three-way catalyst oxygen storage capacity next time step state to provide an updated estimated three-way catalyst oxygen storage capacity; and adjusting, using the engine control module, a plurality of engine control parameters based on the updated estimated three-way catalyst oxygen storage capacity.

2. The method of claim 1, wherein the steps of sensing the plurality of the instant engine control inputs include sensing at least one of a pre-catalyst equivalence ratio, a fuel flow rate, exhaust gas pressure, ambient temperature, a pre-catalyst exhaust gas temperature, oxygen sensor voltage, a metered air per cylinder value, an engine speed value, and a fuel control state value via the at least one sensor.

3. The method of claim 1, wherein the steps of filtering the estimated three-way catalyst oxygen storage capacity next time step state to provide an updated estimated three-way catalyst oxygen storage capacity further comprise filtering the estimated three-way catalyst oxygen storage capacity next time step state to provide an updated estimated three-way catalyst oxygen storage capacity using:

$P_{k|k-1} = F_k P_{k-1|k-1} F_k^T + Q_k$, $S_k = H_k P_{k|k-1} H_k^T R_k$, $K_k = P_{k|k-1} H_k^T S_k^{-1}$, and $\hat{x}_{k|k} = \hat{x}_{k|k-1} + K_k \tilde{y}_k$.

4. The method of claim 3, further comprising calculating a result covariance for use in calculating the estimated three-way catalyst oxygen storage capacity next time step state using:

$P_{k|k} = (I - K_k H_k) P_{k|k-1}$.

5. The method of claim 1, the oxygen sensor is a post oxygen switch sensor.

6. The method of claim 1, the oxygen sensor is a pre-catalyst wide-range post oxygen sensor.

7. An engine system for a vehicle, the engine system comprising:

an internal combustion engine having an exhaust gas outlet;

an exhaust system having a three-way catalyst and an oxygen sensor, and an exhaust gas inlet in downstream communication with the exhaust gas outlet of the internal combustion engine; and an engine control module having a control logic sequence which includes:

a first control logic for presenting a plurality of instant engine control inputs being sensed by at least one sensor;

a second control logic for estimating a three-way catalyst oxygen storage capacity next time step state using:

$\hat{x}_{k|k-1} = f(\hat{x}_{k-1|k-1}, u_k)$, and a modeling error using:

$\tilde{y}_k = z_k - h(\hat{x}_{k|k-1})$, wherein $\hat{x}_{k-1|k-1}$ is a previous estimated three-way catalyst oxygen storage capacity, $U_k$ represents the plurality of the instant engine control inputs, and $z_x$ represents a voltage output of the oxygen sensor;

a third control logic for linearizing the three-way catalyst observer model using:

$$F_k = \frac{\partial y}{\partial x}\bigg|_{\hat{x}_{k-1|k-1}, u_k}, \text{ and}$$

$$H_k = \frac{\partial y}{\partial x}\bigg|_{\hat{x}_{k|k-1}}.$$

wherein the three-way catalyst observer model includes a Kalman filter, a three-way catalyst kinetic model and a three-way catalyst thermal model;

a fourth control logic for calculating a filtered estimated three-way catalyst oxygen storage capacity next time step state and calculating a covariance; and a fifth control logic for adjusting, by the engine control module, a plurality of engine control parameters of the internal combustion engine based on the filtered estimated three-way catalyst oxygen storage capacity next time step state.

8. The engine system of claim 7, wherein the oxygen sensor is one of a post oxygen switch sensor and a pre-catalyst wide-range post oxygen sensor.

9. The engine system of claim 8, wherein the plurality of instant engine control inputs of the internal combustion engine include a pre-catalyst equivalence ratio, a fuel flow rate, exhaust gas pressure, ambient temperature, a pre-catalyst exhaust gas temperature, oxygen sensor voltage, a metered air per cylinder value, an engine speed value, and a fuel control state value.

10. The engine system of claim 7, wherein the third control logic or calculating the filtered estimated three-way catalyst oxygen storage capacity next time step state further includes using:

$P_{k|k-1} = F_k P_{k-1|k-1} F_k^T + Q_k$, $S_k = H_k P_{k|k-1} H_k^T R_k$, $K_k = P_{k|k-1} H_k^T S_k^{-1}$, and $\hat{x}_{k|k} = \hat{x}_{k|k-1} + K_k \tilde{y}_k$, and calculating the covariance using:

$P_{k|k} = (I - K_k H_k) P_{k|k-1}$.

* * * * *